US00RE38393E

(19) United States
(12) Reissued Patent
Bronson

(10) Patent Number: US RE38,393 E
(45) Date of Reissued Patent: Jan. 27, 2004

(54) HARNESS/COMBINATION VEST

(76) Inventor: Armel Bronson, 2110 First Ave. #903, New York, NY (US) 10029

(21) Appl. No.: 09/358,344

(22) Filed: Jul. 21, 1999

Related U.S. Patent Documents

Reissue of:
(64) Patent No.: 5,815,834
Issued: Oct. 6, 1998
Appl. No.: 08/779,346
Filed: Apr. 4, 1996

(51) Int. Cl.[7] ..... A41D 1/04
(52) U.S. Cl. ..... 2/102; 2/49.1; 2/94
(58) Field of Search ..... 2/102, 94, 49.1–49.4, 2/48, 50, 75, 80; 119/770; 280/290; 190/27, 26; 297/464, 465, 468, 483, 484, 485

(56) References Cited

U.S. PATENT DOCUMENTS

| | | | | | |
|---|---|---|---|---|---|
| 1,837,983 | A | * | 12/1931 | Moran | 2/48 |
| 2,424,000 | A | * | 7/1947 | Shanker | 2/48 |
| 2,445,850 | A | * | 7/1948 | Gibson | 2/48 |
| 2,449,741 | A | * | 9/1948 | Fitzpatrick | 2/48 |
| 2,498,471 | A | * | 2/1950 | Williams | 2/48 |
| 2,674,738 | A | * | 4/1954 | Mehlos | 2/48 |
| 2,766,456 | A | * | 10/1956 | Nigro | 2/48 |
| 2,767,403 | A | * | 10/1956 | Givens | 2/48 |
| 3,136,581 | A | * | 6/1964 | Caballero | 2/48 |
| 3,777,310 | A | * | 12/1973 | Yang | 2/48 |
| 3,936,092 | A | * | 2/1976 | Dietz | 2/48 |
| 4,026,245 | A | * | 5/1977 | Arthur | 297/465 |
| 4,564,957 | A | * | 1/1986 | Scharf | |
| 4,571,000 | A | * | 2/1986 | Holder | 128/874 |
| 4,639,946 | A | * | 2/1987 | Koenig | 297/465 |
| 4,719,650 | A | * | 1/1988 | Milloy | 2/49.1 |
| 4,873,725 | A | * | 10/1989 | Mitchell | 2/48 |
| 5,101,515 | A | * | 4/1992 | Holt et al. | 2/94 |
| 5,312,282 | A | * | 5/1994 | Cooper | 446/27 |
| 5,490,289 | A | * | 2/1996 | Lehrer | 2/49.2 |
| 5,815,834 | A | * | 10/1998 | Bronson | 2/102 |
| 6,125,471 | A | * | 10/2000 | Gupta et al. | 2/49.1 |

FOREIGN PATENT DOCUMENTS

| | | | | |
|---|---|---|---|---|
| CA | 462763 | * | 1/1950 | 2/48 |
| GB | 613048 | * | 11/1948 | 2/48 |

* cited by examiner

*Primary Examiner*—Gloria M. Hale

(57) ABSTRACT

A vest and harness combination garment wherein a a child can be securely fastened to a chair when the garment is worn. The vest/harness also includes an insulated bottle holder wherein a child's bottle is placed so that the bottle is available for the child when he/she is hungry or thirsty. A pacifier is attached by a strap to the front of the vest/harness so that the pacifier is readily available to the child as desired. A musical device which plays music when the device is squeezed is attached to the front of the vest for entertaining the child.

24 Claims, 5 Drawing Sheets

HARNESS/COMBINATION VEST

Matter enclosed in heavy brackets [ ] appears in the original patent but forms no part of this reissue specification; matter printed in italics indicates the additions made by reissue.

BACKGROUND OF THE INVENTION

The invention is a vest used to support and/or attach a toddler to a chair and to also have a feeding bottle and pacifier attached to the garment for availability to the toddler as desired. The combination vest/harness allows the child to be tightly secured to a chair when necessary. The combination harness/vest includes a waterproof lining which protects the wearer from liquid or food spillage while eating or drinking.

Toddlers are hyperactive and investigative. Seating a toddler in a chair is a situation in which a toddler may injure themselves. Toddlers may also need assistance in holding a bottle or may need a bottle in a proximal location so that they may access a bottle as desired. Toddlers may also need an amusement device nearby to provide entertainment and distraction.

BRIEF SUMMARY OF THE INVENTION

This invention is directed to a harness/combination vest used for securing a toddler to a chair and to have feeding readly avaiable.

The harness/vest comprises, a strap to secure the toddler to a chair during feeding or when necessary. The straps can also be used to stop the child from straying by holding one end of the strap with other end still secured to the harness.

Besides having a bottle readily available, a small circular devide that plays music when touched is sewed into the left side of the vest next to the bottle pouch. When the child holds the bottle the hands will squeeze the device thus playing music to entertain the toddler. The vest is also equipped with a water proof lining.

DETAILED DESCRIPTION OF THE INVENTION

Figure 1:
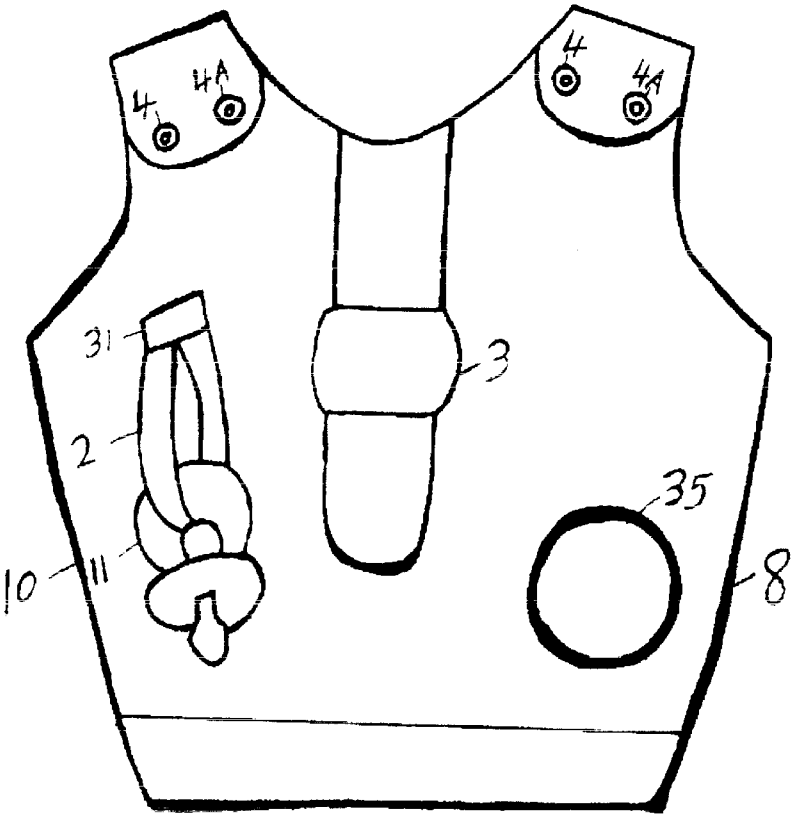
FIG. 1 Is a perspective view of the harness/combination vest (frontal view)

FIG. 1 shows a front panel of the harness/vest combination garment of the present invention. The vest 10, is used to secure a child to a chair and to aid in feeding and entertaining a child. The vest 10 includes a front panel 8 and a rear panel 9. Each front panel 8 and rear panel 9 has side edges. The side edges of the front and rear panels are attached together to form the vest. The vest has shoulder straps at the top of each panel which are attached together with fasteners, such as snaps 4 and 4A. The vest includes a head opening between the shoulder straps. The head opening includes a bias binding to provide comfort and durability around the head opening.

An elongated strap 2 is secured to the front panel 8 of the vest. The elongated strap 2 has one end sewn to a small patch of fabric 31 which is the same material used to construct the vest. The patch 31 is sewn to the front panel of the vest. Strap 2 is put through the loop of a pacifier and is then sewn to the fabric 31 and then to the vest front panel. A pouch, 3 is attached to the vest front panel and is used to secure a baby bottle to the front panel of the vest. The pouch is lined with insulating material and may also be lined with a waterproof material. The material constructing the vest front and rear panels may also be constructed of a waterproof material.

A musical device 35 is also attached to the front panel of the vest. The device plays musical sounds when squeezed.

Figure 2:
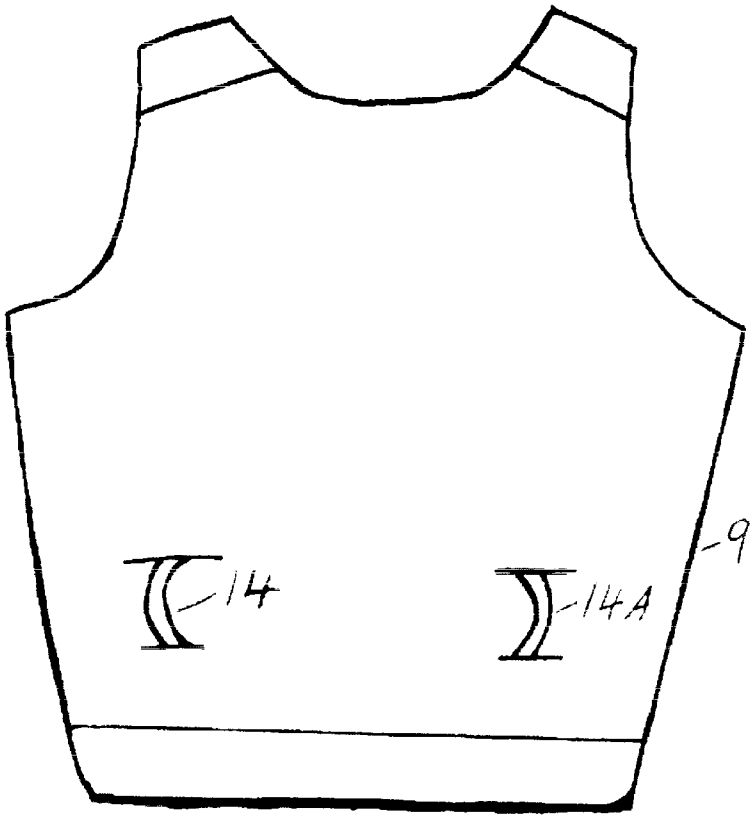
FIG. 2 Is a rear view of the harness/combination vest.

FIG. 2 shows a rear panel of the harness/vest combination garment. In FIG. 2, u-shaped hooks 14 and 14A are attached to the vest. These hooks will allow a rear strap to be fastened thereto.

Figure 4:
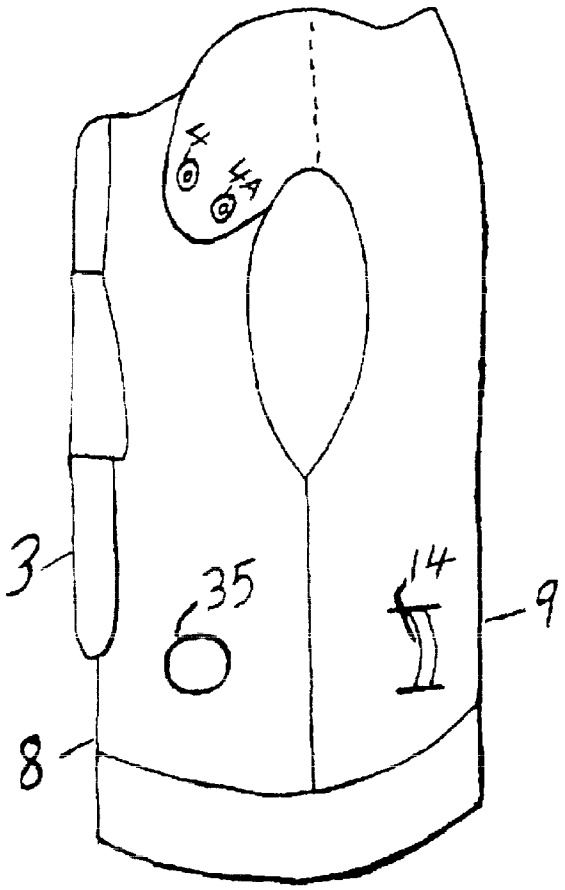
FIG. 4 Is a left sided view of the harness/combination vest.
Figure 3:
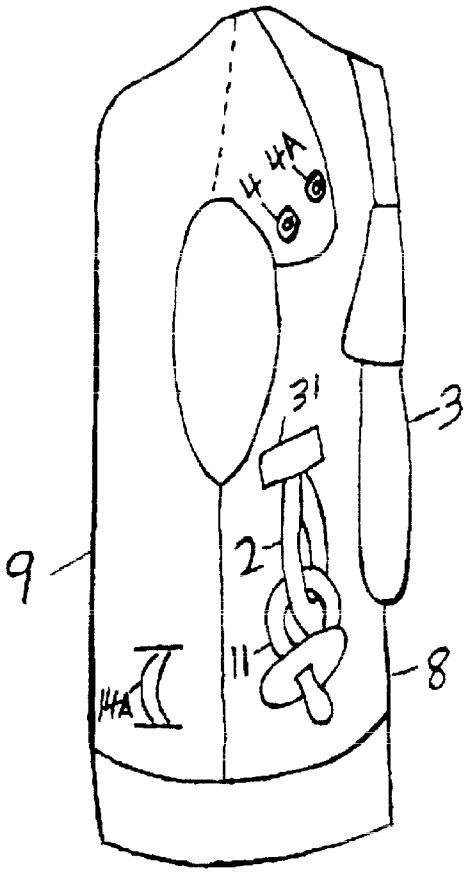
FIG. 3 Is a right sided view of the harness/combination vest.

FIGS. 3 and 4 show the right and left sides of the vest, respectively showing the components as discussed above in FIGS. 1 and 2.

Figure 5:
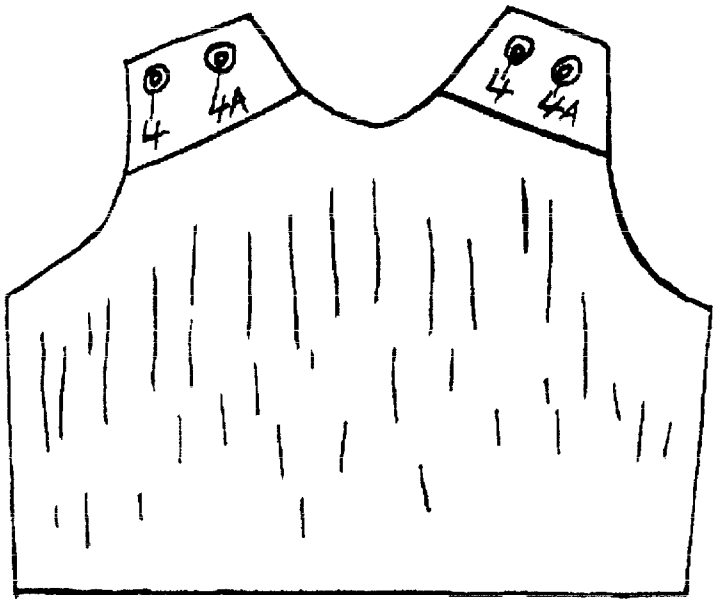
FIG. 5 Is a view of the lining of the harness/combination vest.

FIG. 5 shows the waterproof material used in the vest to protect the wearer from food or drink spillage. The waterproof material lining also adds comfort to the wearer.

Figure 6:
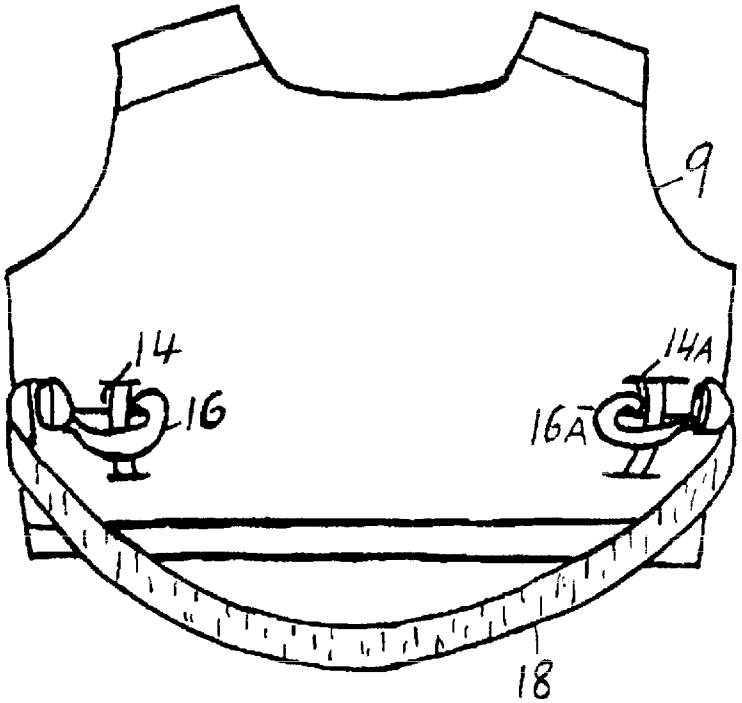
FIG. 6 Is a rear view of the harness/combination vest with the strap attached.

FIG. 6 shows the back panel 9 of the vest with the u-shaped hooks attached thereto (14 and 14A). An elastically extendable strap 18 with coupon hooks 16 and 16a attached at each end is attached to the rear panel of the vest by attaching the u-shaped and coupon hooks together. To secure a child in a chair, the strap 18 is placed behind the back of the chair. The ends of the strap with the coupon hooks 16 and 16A are attached to the U-shaped hooks on the vest 14 and 14A. The strap also includes hooks 22 and loops 23 permanently attached to an inside surface of the extendable strap. In use, the hooks and loops are attached together in a right to left or left to right motion causing the strap to fold and overlap around the chair or components of a chair to tighten the strap and thereby secure the child to the chair.

Figure 7:
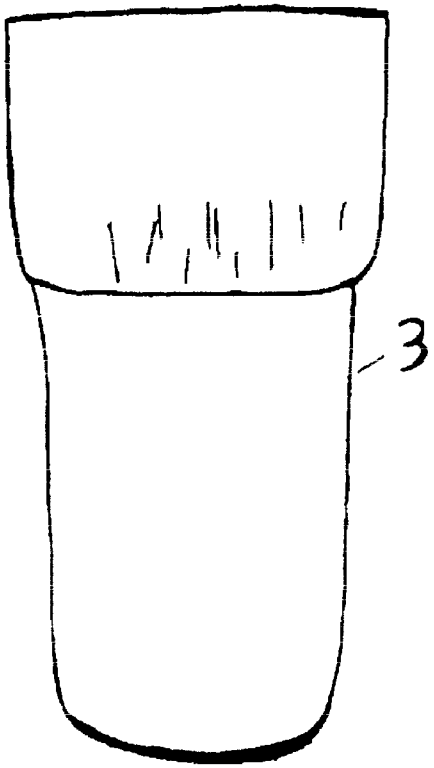
FIG. 7 Is a view of the bottle pouch of the harness/combination vest.

FIG. 7 shows the bottle pouch configuration (3).

Figure 8:
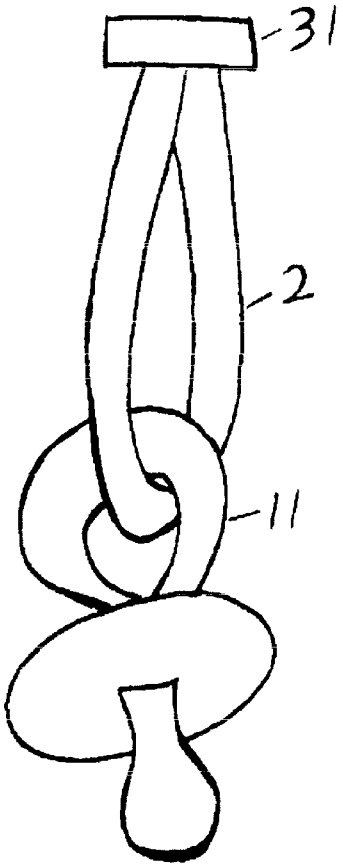
FIG. 8 Is a view of the strap used to secure the pacifier to the harness/combination vest.

FIG. 8 shows the pacifier (11) with the strap (2) attaching the pacifier and fabric attachment (31) together and with the fabric attachment attaching the pacifier and strap to the front panel.

Figure 9:
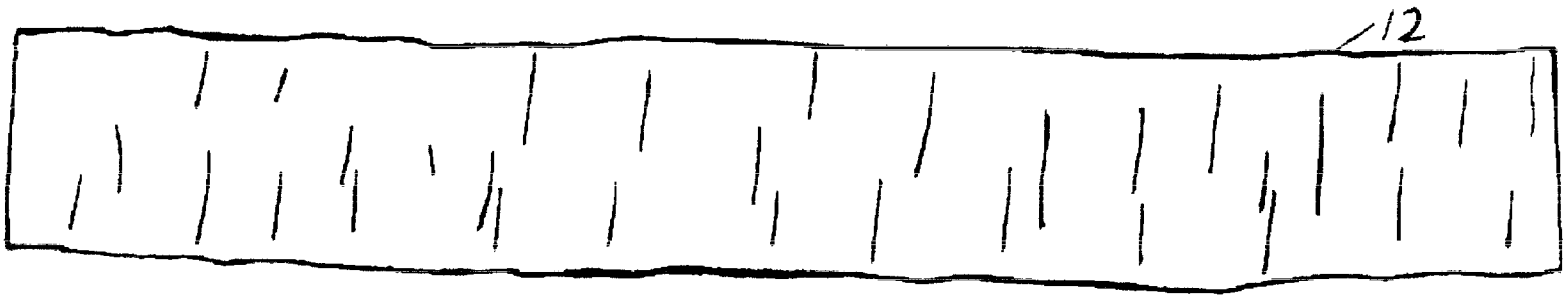
FIG. 9 Is a view of the elastic that is used inside the strap of the harness/combiantion vest.

FIG. 9 shows the elastic (12) that is within the extendable rear strap (18) that is constructed of the same material as the front and rear panels.

Figure 10:
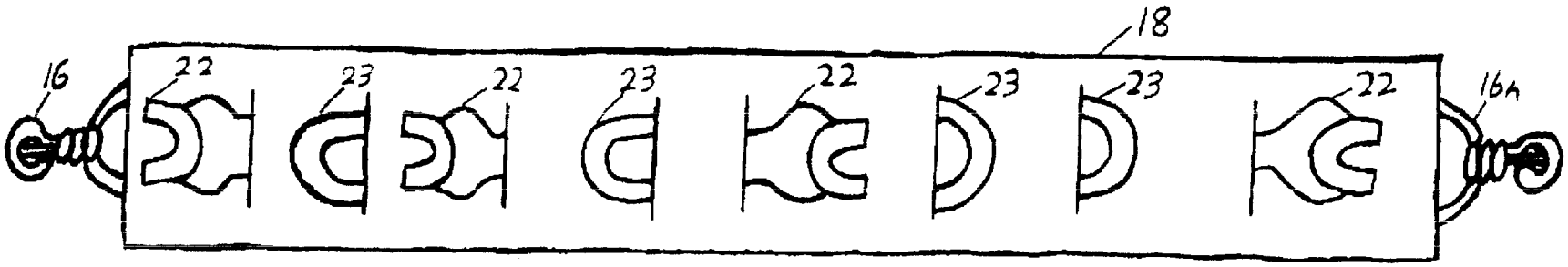
FIG. 10 Is a strap used to secure the toddler to a chair.

FIG. 10 shows an inside of the rear strap with the hooks (22) and loops (23) attached thereto along the length of the strap (18) and spaced there between. The ends of the strap (18) also include the safety hooks (16 and 16a).

We claim:

1. A harness/vest combination garment used to secure a wearer to a chair and aid in feeding comprising, in combination:

a vest including a front panel and a rear panel, each having side edges;

said front and rear panels secured together along said side edges and forming a head opening at an upper edge;

said front and rear panels each including shoulder straps with complementary fastener components to secure said shoulder straps together as desired and to thereby aid in donning and doffing said garment;

said front and rear panels are lined with waterproof material;

an elastically extendable strap is removably attached to said rear panel by a fastening means;

said rear strap extends across said rear panel and is of a length to extend around a chair back to secure said wearer of said vest to said chair;

said front panel has an insulated pouch attached thereto which is sized and constructed for holding a baby bottle and for keeping said bottle contents insulated; and an elongated strap with a pacifier attached at one end is sewn to said front panel at its other end;

said elongated strap is of a length to allow said pacifier to be placed in said wearer's mouth while still being attached to said vest by said elongated strap.

2. A harness/vest combination garment as claimed in claim 1 wherein said front and rear panels are constructed of a soft material and including a bias binding around said neck opening for added comfort to the wearer.

3. A harness/vest combination garment as claimed in claim 1 wherein said rear elastically extendable strap is formed by encasing an elastic strap within the same material that the front and rear panels are constructed of.

4. A harness/vest combination garment as claimed in claim 1 wherein said elastically extendable strap fastening means includes a safety latch hook attached to each end of said strap and u-shaped hooks attached to said rear panels wherein said each safety latch hook is attached to each u-shaped hook when attaching said vest to said chair as desired.

5. A harness/vest combination garment as claimed in claim 1 wherein said bottle pouch includes a waterproof lining.

6. A harness/vest combination as claimed in claim 1 wherein said bottle pouch has an upper end with an elastic periphery to securely hold a bottle in said pouch.

7. A harness/vest combination as claimed in claim 1 wherein said vest includes a musical device attached thereto that plays music when said device is activated by squeezing said device.

8. A harness/vest combination as claimed in claim 1 wherein said elastically extendable strap includes on a side thereof multiple spaced apart hooks and loops attached along the length of the strap.

*9. A harness/vest combination as claimed in claim 1 wherein said front and rear panels are lined with waterproof material.*

*10. A harness/vest combination as claimed in claim 1 wherein said front panel has an insulated pouch attached thereto which is sized and constructed for holding a baby bottle and for keeping said bottle contents insulated.*

*11. A harness/vest combination as claimed in claim 1 wherein an elongated strap with a pacifier attached at one end is sewn to said front panel at the other end of said elongated strap.*

*12. A harness/vest combination as claimed in claim 1 wherein said elongated strap is of a length to allow said pacifier to be placed in said wearer's mouth while still being attached to said vest by said elongated strap.*

*13. A harness/vest combination garment used to secure a wearer and aid in handling accessories comprising, in combination:*

*a vest including a front panel and a rear panel, each having side edges;*

*said front and rear panels secured together along said side edges and forming a head opening at an upper edge;*

*said front and rear panels each including shoulder straps with complementary fastener components to secure said shoulder straps together as desired and to thereby aid in donning and doffing said garment;*

*a rear strap is removably attached to said garment by a fastening means and extends across said rear panel;*

*said front panel has a pouch attached thereto which is sized and constructed for holding a baby bottle and for keeping said bottle contents insulated; and*

*said front panel has an elongated strap attached thereto.*

*14. A harness/vest combination garment as claimed in claim 13 wherein said front and rear panels are constructed of a soft material and including a bias binding around said head opening for added comfort to the wearer.*

*15. A harness/vest combination garment as claimed in claim 13 wherein said rear strap is formed by encasing an elastic strap within soft material.*

*16. A harness/vest combination garment as claimed in claim 13 wherein said means of attaching said rear strap includes a safety latch hook attached to each end of said rear strap and U-shaped hooks attached to said rear panels wherein said each safety latch hook is attached to each u-shaped hook when attaching said vest to said chair as desired.*

*17. A harness/vest combination garment as claimed in claim 13 wherein said insulated pouch includes a waterproof lining.*

*18. A harness/vest combination as claimed in claim 17 wherein said insulated pouch has an upper end with an elastic periphery to securely hold a bottle in said pouch.*

*19. A harness/vest combination as claimed in claim 13 wherein said vest includes a musical device attached thereto that plays music when said device is activated by squeezing said device.*

*20. A harness/vest combination as clamed in claim 13 wherein said rear strap includes on a side thereof multiple spaced apart hooks and loops attached along the length of said rear strap.*

*21. A harness/vest combination as claimed in claim 13 wherein said front and rear panels are lined with waterproof material.*

*22. A harness/vest combination as claimed in claim 13 wherein said front panel has an insulated pouch attached thereto which is sized and constructed for holding a baby bottle and for keeping said bottle contents insulated.*

*23. A harness/vest combination as claimed in claim 13 wherein an elongated strap with a pacifier attached at one end is sewn to said front panel at said elongated strap's other end.*

*24. A harness/vest combination as claimed in claim 23 wherein said elongated strap is of a length to allow said pacifier to be placed in said wearer's mouth while still being attached to said vest by said elongated strap.*

* * * * *